WILLIAM CULL
INVENTOR

WILLIAM CULL
INVENTOR

BY Irvin S. Thompson

ATTORNEY

United States Patent Office 3,179,428
Patented Apr. 20, 1965

3,179,428
WORK HOLDING MEANS
William Cull, Sutton Coldfield, England, assignor to Birfield Engineering Limited, London, England, a company of Great Britain
Filed Aug. 28, 1962, Ser. No. 219,956
Claims priority, application Great Britain, Aug. 29, 1961, 31,015/61
10 Claims. (Cl. 279—4)

This invention relates to work holding means, and in particular to means for holding an internally splined workpiece in a manner which allows the outer surface thereof to be machined.

Internally splined workpieces are normally held for machining operations on expanding mandrels which grip the splined bore of the workpiece and rely on friction to hold the latter. Such mandrels do not provide the positive location of the workpiece necessary for accurate machining, particularly where heavy milling cuts are to be taken and the workpiece has to be indexed and machined to a common center with a high degree of accuracy. The object of the invention is to provide a holding fixture which positively holds an internally splined workpiece and locates it against a locating surface.

According to the invention a holding fixture for an internally splined workpiece comprises a splined mandrel on which the workpiece can be mounted and located in engagement with a locating surface fixed relatively to the mandrel, a gripping member mounted in and projecting from the mandrel with a head so formed that in a free angular position of the member the head clears the splined bore of the workpiece and allows the latter to be fitted on the mandrel and in a gripping angular position has gripping surfaces aligned with corresponding spline-ways of the mandrel, and means for turning the gripping member from the free position after the workpiece has been fitted to the gripping angular position and moving it inwardly into the mandrel so that the gripping surfaces engage the workpiece and clamp it firmly against the locating surface.

It will be appreciated that the holding means of the invention can be used with a workpiece having a longitudinally grooved bore which is not splined within a strict definition of that term, and the term "splined" and related terms as used herein are to be construed broadly enough to include such a workpiece and formation of the holding means to hold the latter.

Preferably the splined outer surface of the mandrel mates accurately with the internally splined surface of the workpiece, and the gripping member may have a head with a similarly splined outer periphery. The inner ends of the splines on the gripping head periphery then form said gripping surfaces which are equal in number to the splines of the workpiece and are aligned with the splineways of the latter when the gripping member is in the free angular position.

Power-operated means are preferably provided to draw the gripping member into the mandrel to grip the workpiece, and these means may comprise a fluid-operated piston and cylinder assembly. To avoid damage to the fixture should the workpiece not clear the gripping head when fitted on the mandrel, either because the workpiece is outside the normal length tolerance or because it is inaccurately located on the mandrel, safety means may be provided which are operative if the gripping head is not free to turn to clamp the workpiece.

Turning of the gripping member to the gripping position may be achieved by a cam slot or the like and a cam follower arranged so that turning movement occurs during and as a result of an initial portion of the inward movement of the gripping member. The cam slot may be formed in a cam member fixed to the gripping member, and the safety device may comprise a mounting for the cam follower which enables the latter to move with the cam slot if more than a predetermined torque has to be applied to the gripping member to turn the latter.

The mandrel and the piston and cylinder assembly may be mounted in an indexing head which can be turned to index the workpiece for successive machining operations. Such an arrangement is conveniently used to hold the inner member of a ball-type constant velocity joint while the necessary ball tracks are machined in the inner member by means of an end-milling cutter.

The invention will now be further described with reference to the accompanying drawings which illustrate, by way of example, an indexing head incorporating a work-holding fixture in accordance with the invention. In the drawings.

Figure 2:
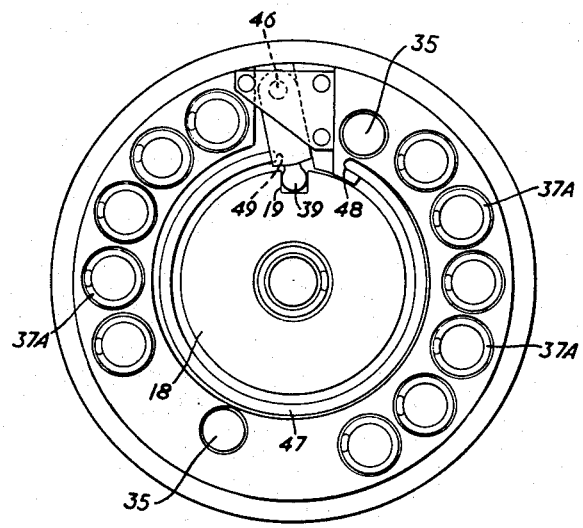
FIGURE 2 is a sectional view on the line II—II in FIGURE 1.
Figure 3:
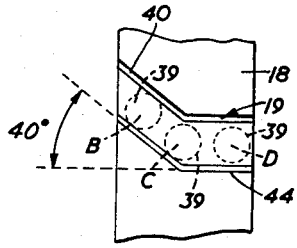
Figure 4:
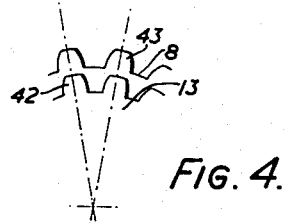
Figure 5:
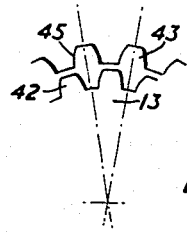

FIGURE 3 is a fragmentary development on a slightly enlarged scale showing the groove 19 in the surface of flange 18 in FIGURE 2, and FIGURES 4 and 5 are alternative diagrammatic views illustrating the gripping action of the fixture.

A workhead of the embodiment has a tubular section 1 forming an indexing sleeve rotatably mounted in anti-friction bearings such as 2 in the body of an associated machine (not illustrated) so that it can be indexed, and held in an indexed position, by means which form no part of the invention and hence will not be described herein.

The tubular section 1 is flanged at the front end at 3 and at the rear end has bolted thereto a cylinder 5 of a piston and cylinder assembly 4, 5 forming power-operated means of the fixture. A front section 6 of the workhead is bolted to the flange 3 and tapers forwardly to a plane locating surface 7 which is suitably hardened. A hollow mandrel 8 in the front section 6 projects forwardly from the latter, the mandrel having a splined projecting end portion 9 which is coaxial with the indexing axis A—A of the workhead.

Figure 1:
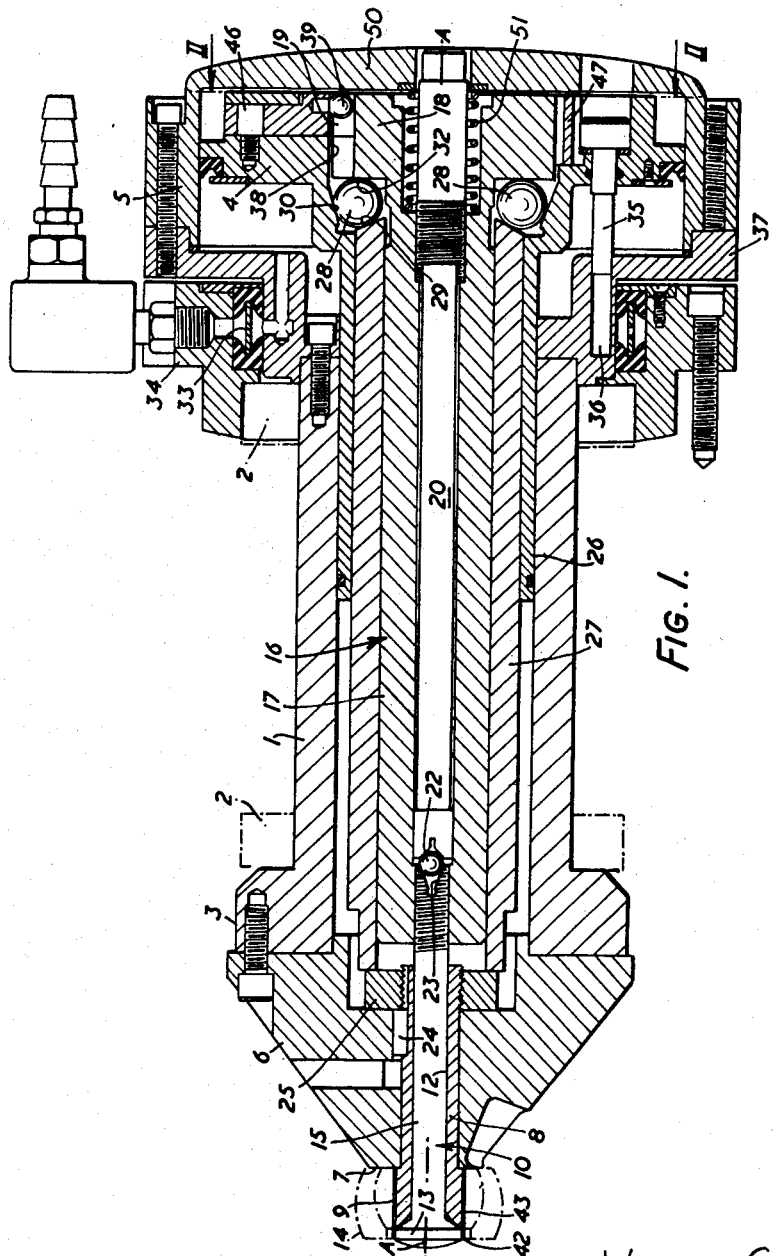
FIGURE 1 is an axial sectional view of the indexing head.

A gripping member 10 mounted for sliding movement within a central bore 12 of the mandrel 8 has a gripping head 13 the outer periphery of which is splined similarly to the mandrel portion 9 which mates with an internally splined workpiece such as 14 which is to be machined while held by the fixture. The workpiece 14 illustrated in FIGURE 1 is the inner member of a ball-type constant velocity joint.

The stem 15 of the gripping member 10 is screwed and locked into a cam member 16 which has a tubular cylindrical section 17 extending through the central section of the workhead and terminating in a rear end flange 18 in the outer perihery of which is cut a cam slot or groove 19, the shape and purpose of which is described hereinafter. Locking of the gripping member 10 is achieved by means of a threaded locking rod 20 threaded coaxially within the cam member 16. The rod 20 engages a locking ball 22 which in turn engages a cross slot 23 in the inner end of the stem 15 to spread that end and lock the member 10 firmly in position. The arrangement not only enables the gripping member 10 to be changed to suit a different workpiece 14 but also enables the angular position of the head 13 relatively to the mandrel 8 to be accurately adjusted and retained. The mandrel 8 is keyed to the workhead section 6 at 24 so that its angular position is fixed, and it is clamped against the face 7 by a retaining nut 25. Thus the mandrel 8 can also be changed to suit the workpiece 14.

The piston 4 of the piston and cylinder assembly is concentric with the cam member 16 and is recessed to accommodate the flange 18 which passes through the piston 4, the latter having a forward sleeve extension 26 which is a sliding fit within the tubular section 1 of the workhead. The sleeve extension 26 is a loose running fit on a tubular cylindrical compression member 27 which is a loose running fit on the cam member 16 forwardly of the flange 18 thereof, forward end location of the compression member 27 being provided by the retaining nut 25 and the front section 6.

A ring of ten balls 28 is arranged in the recess in the rear face of the piston 4, the balls bearing against a frusto-conical end bearing surface 29 of the compression member 27, a frusto-conical bearing surface 30 adjacent the inner end of the recess and a front bearing surface 32 of the flange 18. The bearing surface 29 is inclined radially inwardly and rearwardly, this surface in radial cross-section as shown in FIGURE 1 being approximately perpendicular to the bearing surface 30 on piston 4, and in the illustrated construction at an angle of approximately 80° thereto.

In use, pressure fluid admitted to the cylinder 5 via a running seal 33 from a fixed supply head 34 acts on the forward face of the piston 4 to move the latter rearwardly, i.e. to the right in FIGURE 1. Guide pins such as 35 projecting forwardly from the piston 4 engage guide bores 36 in the head 37 of the cylinder 5 to ensure that the piston 4 does not turn during this movement. Separate return springs 37A (see FIGURE 2) are provided, lying in pockets in the rear face of the piston 4 and abutting against the rear end wall 50 of the cylinder 5, to urge the piston 4 forwards to the free or resting position, in which position the bearing balls 28 are in engagement with an outer cylindrical wall portion 38 of the cylinder recess, being urged lightly outwards at all times by the pressure of a spring 51 acting between an internal recess in the flange 18 and the end wall 50 of the cylinder 5. This spring 51 also tends to hold the flange 18, cam member 16, and gripping head 13, forwards, so that in the free position the rear face of gripping head 3 is spaced a short distance in front of the front face of the mandrel 8.

In the free position the ball end of a cam follower 39 engages the forward end of an inclined portion 40 of the cam groove 19 at a position B (see FIGURE 3) to hold the gripping head 13 with the splines 42 thereof in alignment with the splines 43 of the mandrel 8 (see FIGURE 4). FIGURE 4 illustrates diagrammatically the relative position of the splines 42 and 43 in the free position, the splines illustrated being offset radially to show that position. In actual fact, they are aligned in the axial direction. The workpiece 14 can now be slid over the gripping head 13 into position on the mandrel 8 against the locating surface 7 as shown in FIGURE 1.

Fluid pressure is then admitted to the cylinder 5 and moves the piston 4 rearwardly. For the first part of this movement the balls 28 remain in contact with the cylindrical wall 38 and do not move inwards. The cam follower 39 during this first part of the piston movement is engaged in the forward half 40 of the cam groove 19 which is inclined at 40° to the longitudinal axis x—x of the cam member 16.

During the first half of this piston movement therefore the cam follower 39 moves along the groove portion 40 from the position B to a position C and therefore rotates the cam member 16 and hence the gripping head 13 one half tooth spacing from the free position to the gripping position shown in FIGURE 5, in which the splines 42 are aligned with the spline-ways 45 of the mandrel 8 and hence with the ends of the splines of the workpiece 14. The second part of the rearward movement of piston 4 causes surface 30 to move the bearing balls 28 radially inwardly along the bearing surfaces 29 and 32, the shape of these surfaces producing reduced rearward movement of the cam member 16 and hence the gripping head 13 to the operative position shown in FIGURE 1. The inclined bearing surfaces 29, 30, 32 provide a mechanical advantage for operation of the gripping head 13 of the order of 6.4:1, as between the piston 4 and the gripping head. The second part of the rearward movement of the cam member 16 and gripping head 13 is effected without turning of the latter as the cam follower 39 moves along the cam groove portion 44 from the position C to position D. The rearward movement of the piston 4 and the cam member 16 is terminated when the gripping head 13 abuts against the end of the workpiece 14 to clamp the latter firmly against the locating surface 7.

In order to prevent damage to the fixture should the workpiece 14 be outside the normal length tolerance, or prevented by foreign matter from bedding on the locating surface 7 so that it does not clear the gripping head 13, safety means are provided which comprise a spring-loading mounting for the cam follower 39 as shown particularly in FIGURE 2. The cam follower 39 is pivoted on the rear face of the piston 4 at 46, and a split ring spring 47 has one end 48 anchored in the piston 4 and the other end 49 engaging the cam follower 39 to urge it to the normal position shown in the drawings.

The loading of the cam follower 39 by the spring 47 is sufficient to ensure that the gripping head 13 will be turned to the gripping position if it is free to do so, but if the gripping head 13 is still within the splines of the workpiece 14 and hence unable to turn, the spring loading of the cam follower 39 allows the latter to pivot at 46 on the piston 4. In this case the cam follower 39 follows the cam groove 19 during movement of the piston and the cam member 16 is moved rearwardly without turning so that the gripping head 13 moves within the splines of the workpiece 14 and the fixture is not strained. Should the operation of the safety means not be noticed by the machine operator a scrap component may be produced, or possibly the milling cutter broken, but serious damage to the indexing head itself will be avoided.

I claim:

1. A holding fixture for an internally splined workpiece, comprising a splined mandrel on which the workpiece can be mounted and located in engagement with a locating surface fixed relatively to the mandrel, a gripping member mounted in and projecting from the mandrel with a head formed with lateral toothed projections affording gripping surfaces facing said locating surface so that in a free angular position of the member the head clears the splined bore of the workpiece and allows the latter to be fitted on the mandrel and in a gripping angular position has said gripping surfaces aligned with corresponding spline-ways of the mandrel, and including means for turning the gripping member from the free position, after the workpiece has been fitted, to the gripping angular position, and then moving it in an axial direction inwardly into the mandrel so that the gripping surfaces engage the workpiece and clamp the workpiece firmly against the locating surface.

2. A fixture according to claim 1, wherein the gripping head periphery is splined similarly to the mandrel, the inner ends of the splines on the head forming said gripping surfaces.

3. A fixture according to claim 1, wherein power-operated means are provided acting first to rotate the gripping member to the gripping angular position and then to draw the gripping member axially into the mandrel.

4. A fixture according to claim 3, in which the power-operated means includes a linear motor and cam means including a member formed with a cranked cam slot, and connected to said gripping head and operatively connected to said motor, and a relatively fixed cam follower engaging said slot.

5. A fixture according to claim 3, wherein safety means are provided which render the power operated means inoperative if the gripping head is not free to turn to the gripping angular position.

6. A fixture according to claim 4, including a safety device comprising a resilient mounting for the cam follower which enables the latter to move with the cam slot if more than a predetermined torque has to be applied to the gripping member to turn the latter.

7. A fixture according to claim 3, wherein the power-operated means acts on the gripping member to produce inward movement thereof through a force transmitting mechanism providing a mechanical advantage.

8. A fixture according to claim 7, wherein the power-operated means includes a piston which acts on the gripping member through a ring of balls which engage that member and also engage inclined bearing surfaces formed respectively on the piston and a member fixed axially of the fixture, so that the balls move not only in the axial direction with the gripping member but also radially in accordance with the inclinations of the bearing surfaces.

9. A fixture according to claim 8, wherein the said bearing surfaces are mutually inclined at an angle of about 90°.

10. A holding fixture for an internally splined workpiece, comprising a splined mandrel on which the workpiece can be mounted and located in engagement with a locating surface fixed relatively to the mandrel, a gripping member mounted in and projecting from the mandrel with a head formed with lateral toothed projections affording gripping surfaces facing said locating surface so that in a free angular position of the member the head clears the splined bore of the workpiece and allows the latter to be fitted on the mandrel and in a gripping angular position has said gripping surfaces aligned with corresponding spline-ways of the mandrel, including means for selectively rotating the gripping member into one or other of two operative angular positions in relation to the mandrel, spaced apart angularly by half the spline spacing, so that in a first free position of the gripping member the toothed projections thereon are aligned with the splines on the mandrel, while in the other operative position the toothed projections are aligned with the midpoints of the gaps between the splines on the mandrel.

References Cited by the Examiner
UNITED STATES PATENTS

| | | | |
|---|---|---|---|
| 2,681,805 | 6/54 | Parker | 279—1 |
| 2,788,978 | 4/57 | Fallon | 279—1.1 |
| 2,852,263 | 9/58 | Hohwart | 279—2 |
| 2,880,005 | 3/59 | Parker | 279—1 |

FRANK SUSKO, *Primary Examiner.*

ROBERT C. RIORDON, *Examiner.*